United States Patent [19]
Lutz et al.

[11] Patent Number: 5,982,063
[45] Date of Patent: Nov. 9, 1999

[54] ELECTRIC MOTOR WITH INTERNAL BRAKE

[75] Inventors: Jon F. Lutz, Westminster; Kevin R. Lewis, Littleton, both of Colo.

[73] Assignee: Unique Mobility, Inc., Golden, Colo.

[21] Appl. No.: 08/993,710

[22] Filed: Dec. 18, 1997

[51] Int. Cl.$^6$ .................................................. H02K 7/102
[52] U.S. Cl. ................................................. 310/77; 310/93
[58] Field of Search ............................. 310/77, 93, 103, 310/156

[56] References Cited

U.S. PATENT DOCUMENTS

| | | | |
|---|---|---|---|
| 3,626,220 | 4/1970 | Niculescu | 310/93 |
| 4,022,301 | 5/1977 | Hansen | 188/166 |
| 4,103,763 | 8/1978 | Glöckner et al. | 192/2 |
| 4,223,255 | 9/1980 | Goldman et al. | 318/138 |
| 4,494,058 | 1/1985 | Berti | 318/372 |
| 4,560,895 | 12/1985 | Zahner | 310/77 |
| 4,910,423 | 3/1990 | Werber | 310/77 |
| 5,050,711 | 9/1991 | Sawato | 310/77 |
| 5,121,018 | 6/1992 | Oldakowski | 310/77 |
| 5,306,989 | 4/1994 | Feller, Jr. | 310/77 |
| 5,406,180 | 4/1995 | Feller, Jr. | 310/77 |
| 5,438,228 | 8/1995 | Couture et al. | 310/67 R |
| 5,465,802 | 11/1995 | Yang | 310/67 R |
| 5,796,192 | 8/1998 | Riepl | 310/77 |

FOREIGN PATENT DOCUMENTS

| | | | |
|---|---|---|---|
| 0699550 | 6/1996 | European Pat. Off. | |
| 1142406 | 1/1961 | Germany | 310/77 |
| 60-55840 | 4/1985 | Japan | 310/77 |
| 224649 | 11/1924 | United Kingdom | 310/77 |

*Primary Examiner*—Clayton LaBalle
*Attorney, Agent, or Firm*—Burns, Doane, Swecker & Mathis, LLP

[57] ABSTRACT

An electric motor assembly has an inner-rotor configuration including a hollow space within the rotor hub. The hollow space houses at least part of a brake for providing a braking force between a rotor and a stator of the electric motor. The brake can be configured to provide a braking force when no power is flowing to the electric motor, and can have an outer diameter less than an inner diameter of the rotor.

3 Claims, 7 Drawing Sheets

ELECTRIC MOTOR WITH INTERNAL BRAKE

BACKGROUND OF THE INVENTION

1. Field of the Invention

The invention relates generally to the field of electric motors having brakes.

2. Description of Related Art

Many applications that require electric motors also require brakes, hence there are a multitude of inventions combining these two technologies. In particular, electrically motorized wheel hub applications often require a mechanism for slowing the wheel, or holding the wheel stationary.

In one example, U.S. Pat. No. 5,438,228 to Couture et al. describes an electrically motorized wheel assembly where the electric motor has an outer-rotor configuration, and a mechanical brake assembly includes a disc located adjacent to the stator and having a diameter smaller than an inner diameter of the rotor.

In another example, U.S. Pat. No. 5,465,802 to Yang discloses an electric motor located within a wheel and having means for disengaging the motor from the wheel axle. In particular, a rotor is fixed inside a wheel frame, and a stator is located within the rotor and is attached to an axle. A brake element fixes the stator relative to the axle when actuated, so that the stator and the axle rotate together. When the brake element is not actuated, the stator rotates freely about the axle with the wheel when no current is supplied to the motor. The brake does not brake the motor output, but instead engages and disengages the motor with respect to the wheel axle, thus allowing the wheel to rotate freely when no current is supplied to the motor.

U.S. Pat. No. 3,626,220 to Niculescu, U.S. Pat. No. 4,022,301 to Hansen, U.S. Pat. No. 4,103,763 to Glöckner et al., U.S. Pat. No. 4,494,058 to Berti, No. 4,910,423 to Werber, U.S. Pat. No. 5,050,711 to Sawato, U.S. Pat. No. 5,121,018 to Oldakowski and U.S. Pat. Nos. 5,306,989 and 5,406,180 to Feller describe various electric motors each having an inner-rotor configuration and a brake mechanism that is larger in diameter than the motor rotor.

Such motor and brake combinations can be relatively bulky. They are also suboptimal for some applications, such as wheel drives, where it desirable to minimize an axial length of the electric motor and brake components.

Alternatively, electric current can be applied to the motor in a controlled fashion to generate a force between the rotor and the stator that maintains the position of the rotor relative to the stator and thus holds the wheel stationary. If the wheel is moving, the current can be controlled to generate a force between the rotor and the stator that reduces the velocity of the rotor relative to the stator, thus slowing the wheel.

However, it may not be desirable to expend electrical energy to hold the wheel parked and stationary. In addition, mechanical brakes are typically simpler, less expensive, more reliable and consume less electrical energy (if any) than electric motor systems that generate braking force by selectively applying electrical power to the motor.

OBJECTS AND SUMMARY

Accordingly, a need exists for a motor and brake combination that is compact in overall volume and axial length.

An embodiment of the present invention satisfies this need by providing an electric motor assembly having an inner-rotor configuration and a hollow space within the rotor hub that houses at least part of a brake for providing a braking force between the rotor and the stator of the electric motor. The brake can be configured to provide a braking force when no power is flowing to the electric motor. The brake can also be configured to provide a braking force when the rotational speed of the electric motor drops below a predetermined threshold.

Additional features and advantages of the invention will become apparent from the following description of the preferred embodiments, taken in conjunction with the accompanying drawings. The accompanying drawings illustrate, by way of example, the principles of the invention.

DETAILED DESCRIPTION OF THE PREFERRED EMBODIMENTS

In an exemplary embodiment of the present invention, a brushless permanent magnet (BPM) motor is used because BPM motors can be configured to have a hollow interior. A BPM motor having the following characteristics is particularly desirable: a) a large diameter; b) a high pole count; c) a radial gap; d) an inner rotor configuration; and e) magnets mounted on an outer circumferential surface of the rotor. Each of the magnets mounted on the rotor forms a pole. A high pole count motor has more poles or magnets than a low pole count motor. Thus, given the same diameter, the poles or magnets in the high pole count motor are narrower than the poles or magnets in the low pole count motor, when viewed radially from the rotational axis of the rotor. In other words, each pole or magnet in the high pole count motor covers a smaller radial angle than each pole or magnet in the low pole count motor. This narrow pole width in the high pole count motor allows a thin return path, i.e., the iron thickness required underneath the magnet on the opposite side of the magnet from the winding can be relatively small. A high pole count motor when compared to a low pole count motor therefore has a more "shell-like" geometric structure, where the interior of the motor is hollow.

High pole-count motor configurations are also particularly well suited to high torque applications, since an amount of force per pole required to generate a given amount of torque decreases as the pole count increases. High torque motors can be particularly advantageous in applications such as wheel hub motors for electric vehicles, for example electrically motorized wheelchairs, forklifts, and the like.

Figure 1:
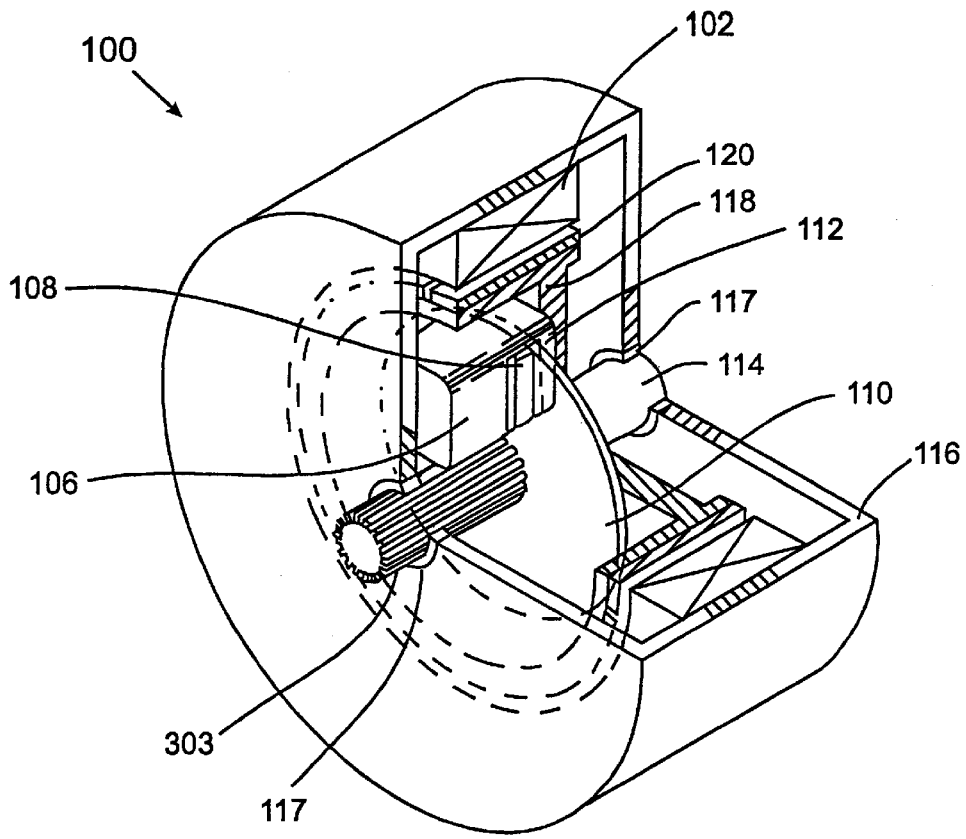
FIG. 1 is a perspective view of a motor assembly according to a first preferred embodiment of the present invention.

FIG. 1 shows such a perspective view of a BPM motor assembly 100 according to a first preferred embodiment of the invention, including a brake assembly and encompassed within a housing 116. Components of the motor assembly 100 include a stator core 102, and permanent magnets 120 affixed to a rotor hub 118. The rotor hub 118 is affixed to a rotor shaft 114. The rotor shaft 114 is supported by motor bearings 117.

Figure 5:
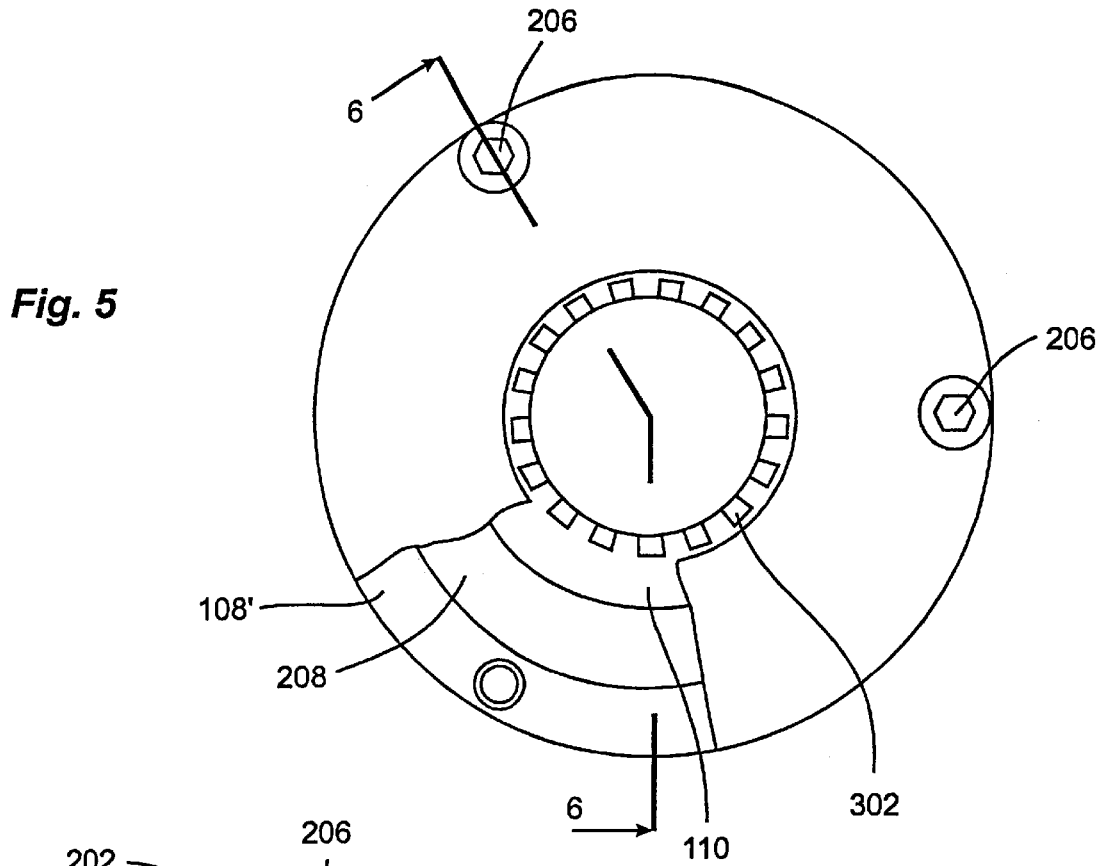
FIG. 5 is an axial view of part of an alternate implementation of the brake assembly shown in FIG. 1.

The brake assembly is made up of a brake core assembly 106, a brake actuating plate 108, a brake disc 110, and a brake containment portion 112 attached to the brake core assembly 106. The disc 110 has splines 302 as shown in FIG. 5, that interlock with corresponding splines 303 in the rotor shaft 114. The splines 302 and 303 ensure that the rotor shaft 114 and the disc 110 rotate together and not relative to each other. Those skilled in the art will appreciate that the disc 110 can be rotationally fixed relative to the rotor shaft 114 in different ways. For example, instead of having splines the rotor shaft 114 can be configured with a hexagonal shape and the disc 110 can be configured with a corresponding hexagonal hole.

Figure 2:
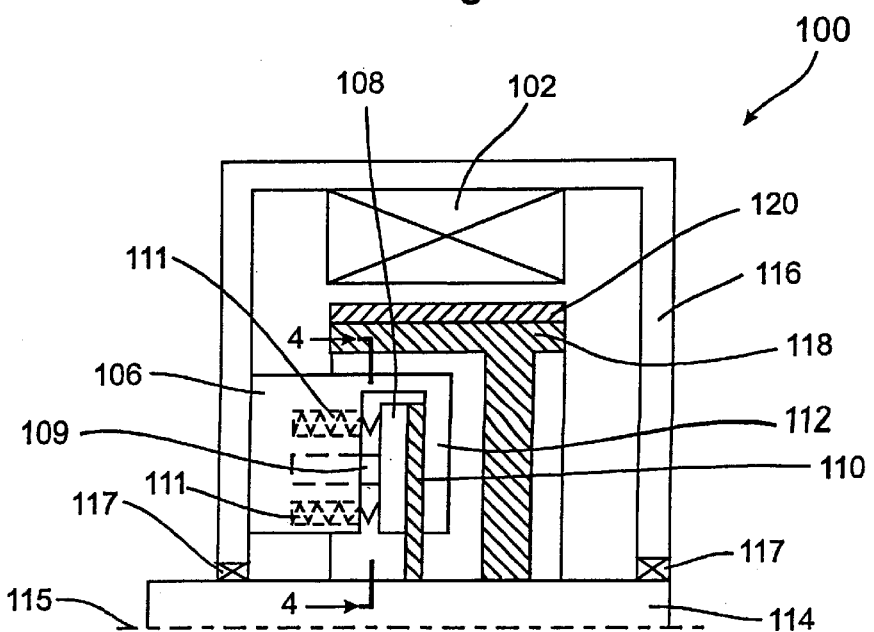
FIG. 2 is a cross-sectional view of the motor assembly of FIG. 1 above the rotor shaft 114, with a brake assembly in an engaged position.

FIG. 2 shows a cross-sectional view of the motor assembly of FIG. 1 above a rotational axis 115 of the rotor shaft 114, with the brake assembly in an engaged position. In addition to the elements shown in FIG. 1, FIG. 2 also shows a brake piston 109 that pulls the brake actuating plate 108 away from the brake disc 110, and brake springs 111 that urge the brake actuating plate 108 toward the brake disc 110.

The brake is arranged in a "failsafe" configuration wherein when the brake is actuated, the piston 109 overcomes the force exerted by the springs 111 and pulls the brake actuating plate 108 away from the brake disc 110, thus releasing the brake. When the brake is not actuated, the springs 111 press the brake actuating plate 108 toward the brake disc 110, squeezing the brake disc 110 between the plate 108 and the containment portion 112 to engage the brake and generate a braking force. FIG. 2 shows the brake in an engaged position, and FIG. 3 shows the brake in a disengaged position.

The splines 302 and 303 of the brake disc 110 and the rotor shaft 114 can be configured to allow the disc 110 to move axially along the rotor shaft 114 to ensure that the forces exerted on the brake disc 110 by the brake actuating plate 108 and the containment portion 112 are equal or balanced, and to ensure that braking surfaces within the brake come into full contact when the brake is engaged.

Figure 3:
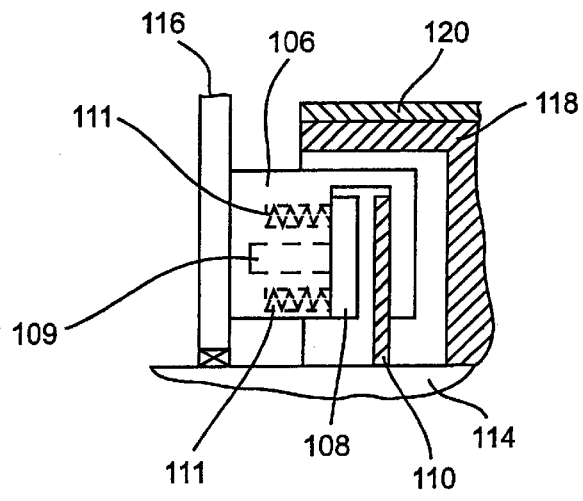
FIG. 3 is a cross-sectional view of the brake assembly shown in FIGS. 1 and 2, in a disengaged position.

The brake piston 109 and brake actuating plate 108 shown in FIGS. 2 and 3 are preferably driven by an electromagnet (not shown in FIGS. 1–3) within the brake core assembly 106. A controller (as shown for example in FIG. 12) such as a microcontroller or microprocessor is also preferably provided in this and other embodiments to coordinate brake and motor functions, for example by appropriately activating and deactivating the electromagnet in connection with operation of the motor.

For example, regenerative braking is often used to brake a rotating electric motor drive shaft until the rotational speed becomes low enough that regenerative braking is no longer effective. Then, a friction brake is applied to further reduce the speed. Regenerative braking refers to the situation where voltage is not applied to the electric motor, and the motor is used as an electric generator so that rotation of the motor shaft causes the motor to generate an electric current. This current can be used, for example, to recharge batteries. Alternately, a reverse current can be applied to the motor to initially reduce a rotational speed of the motor.

Accordingly, in the failsafe configuration described with respect to FIG. 2, the controller can, for example, prevent the motor from fighting against the brake by actuating the electromagnet to disengage the brake by pulling the brake actuating plate 108 away from the brake disc 110 in opposition to the springs 111, before a voltage and current are applied to the motor. In addition, the controller can control a regenerative braking process or a reverse current braking process in conjunction with the friction brake shown in FIGS. 1–3, to deactivate the electromagnet when the motor shaft rotational speed is sufficiently low and thereby allow the springs 111 to engage the friction brake and generate a braking force on the motor shaft.

Those skilled in the art will also recognize that sensors can also be included to provide appropriate information to the controller, for example a sensor for indicating an amount and direction of electric current applied to the motor, and a sensor for indicating rotational position and/or speed of the motor shaft and rotor. Details of implementing the controller and associated sensors and control connections will be apparent to those skilled in the art, and are not further discussed in this document.

Figure 4:
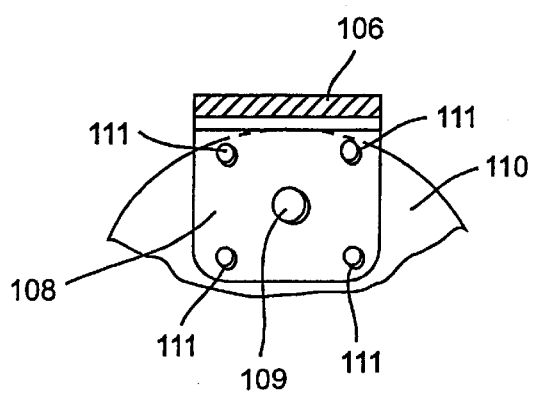
FIG. 4 is an axial view along the lines 4—4 of FIG. 2 of part of the brake assembly.

FIG. 4 shows an axial view along the lines 4—4 of FIG. 2 of part of the brake assembly. In particular, FIG. 4 shows several brake springs 111 grouped symmetrically around the brake piston 109. This symmetrical grouping causes the force exerted by the brake springs 111 to be distributed evenly along a contact surface between the brake actuating plate 108 and the brake disc 110, thereby enhancing operation of the brake. Those skilled in the art will also realize that the brake springs in this and other embodiments can be appropriately varied in size, strength, number, configuration, and relative location within the brake to provide optimal braking function depending on particular circumstances under which the invention is implemented and employed. For example, to generate a given braking force, multiple brake discs 110 can be used and a number of springs having a given strength can be traded against the number of brake discs. In other words, to generate a given braking force fewer springs are necessary when more brake discs are provided, and vice-versa.

Figure 6:
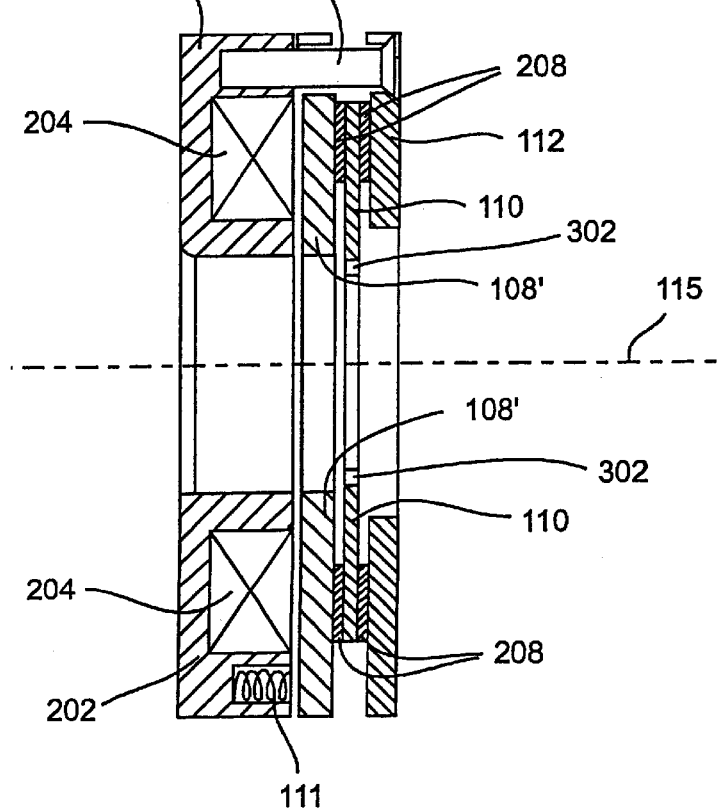
FIG. 6 is a cross-sectional view of the brake assembly of FIG. 5 along lines 6—6.

FIGS. 5 and 6 show an alternate implementation of the brake assembly shown in FIGS. 1–4. In particular, FIG. 5 is an axial view of part of the alternate implementation, and FIG. 6 is a cross-sectional view of the brake assembly of FIG. 5 along lines 6—6. FIGS. 5 and 6 show that the brake actuating plate 108' and the brake containment portion 112 extend annularly around the rotor shaft axis 115. Brake pads 208 also extend annularly around the rotor shaft axis 115, and are affixed to the brake actuating plate 108' and the brake containment portion 112 respectively, to provide a friction surface for contacting the brake disc 110. A brake core 202 also extends annularly around the rotor shaft axis 115.

Containment bolts 206 located symmetrically about the rotor shaft axis 115 fix the containment portion 112 in position relative to the brake core 202. Although only one brake spring 111 is shown in FIG. 6, a plurality of brake springs 111 are also provided in the brake core 202 symmetrically about the rotor shaft axis 115.

A toroidal winding 204 functions as an electromagnet. Energizing the toroidal winding 204 generates a magnetic force that pulls the actuation plate 108' away from the disc 110 in opposition to pressure exerted by the brake springs 111, thus disengaging the brake and allowing the disc 110 and the rotor shaft 114 to rotate freely with respect to the stator core 102 and motor housing 116. When the toroidal winding 204 is de-energized, the brake springs 111 press the actuation plate 108' away from the brake core 202 and toward the disc 110. Since the disc 110 is trapped between the pads 208 affixed to the actuation plate 108 and the containment portion 112, force exerted by the springs 111 urges the pads 208 against the disc 110 and generates a braking force on the disc 110.

Figure 7:
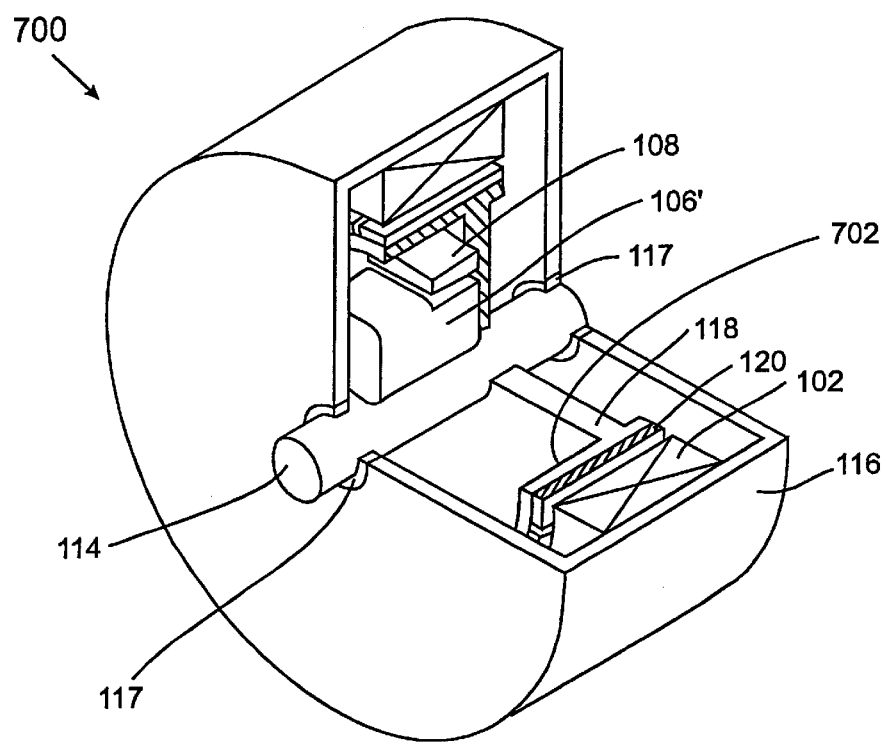
FIG. 7 is a perspective view of a motor assembly according to a second preferred embodiment of the present invention.
Figure 8:
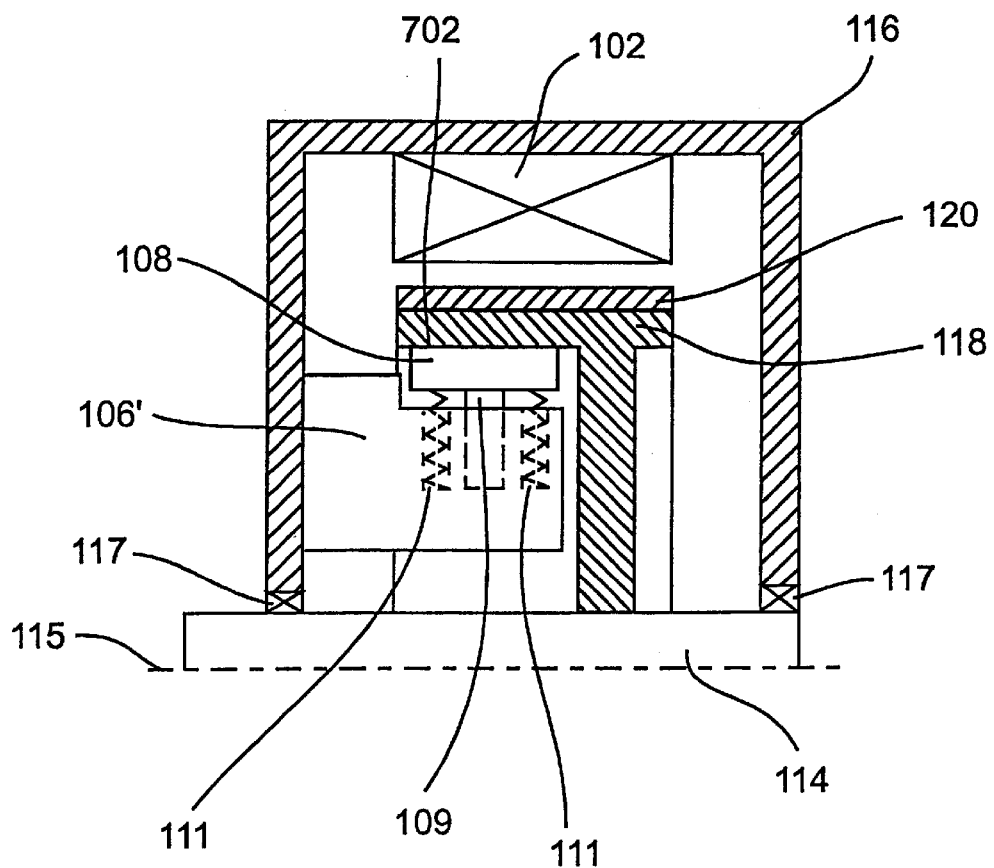
FIG. 8 is a cross-sectional view of the motor assembly of FIG. 7 above the rotor shaft 114, with a brake assembly in an engaged position.
Figure 9:
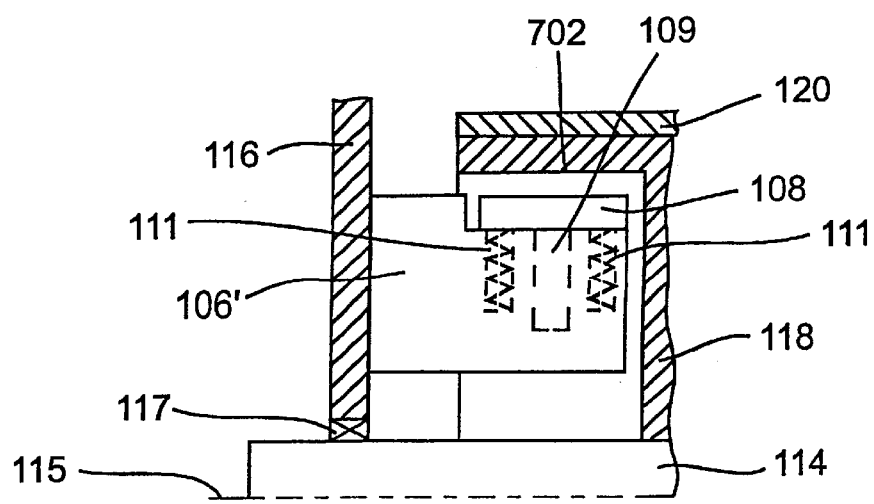
FIG. 9 is a detailed illustration of the brake assembly shown in FIGS. 7 and 8, in a disengaged position.

FIG. 7 shows a BPM motor assembly 700 according to a second preferred embodiment of the invention. The motor assembly 700 is substantially similar to the motor assembly 100 of FIG. 1, but differs in that it has a drum-type brake instead of a disc-type brake. FIGS. 8 and 9 are cross-sectional views of the motor assembly of FIG. 7 above the rotor shaft 114. FIG. 8 shows the brake in an engaged position, and FIG. 9 shows the brake in a disengaged position.

Braking force is generated when the brake core assembly 106 presses the actuation plate 108 in a radial direction away from a rotational axis of the rotor shaft 114, so that the actuation plate 108 exerts pressure on an inside surface 702 of the rotor hub 118. Thus, the rotor hub 118 acts as a drum for the brake, and the inside surface 702 of the rotor hub 118 functions as a braking surface for generating friction and thus braking force. Brake pads or shoes (not shown) can be affixed to the actuation plate 108 between the actuation plate 108 and the inside surface 702. Multiple brake core assemblies 106 can be provided located symmetrically about the rotor shaft axis 115, to ensure that braking force are evenly applied across the braking surfaces and to ensure that forces on the rotor hub are balanced.

As in the first preferred embodiment described above, the brake within the motor assembly 700 is arranged in a "failsafe" configuration. Springs 111 are provided within the brake core assembly 106' to engage the brake by urging the actuation plate 108 toward the inner surface 702 of the rotor hub 118. An electromagnet (not shown) can be provided in the brake core assembly 106' to disengage the brake. When the electromagnet is activated, it pulls the piston 109 and the actuation plate 108 away from the inner surface 702 in opposition to the springs 111, thus disengaging the brake.

Figure 10:
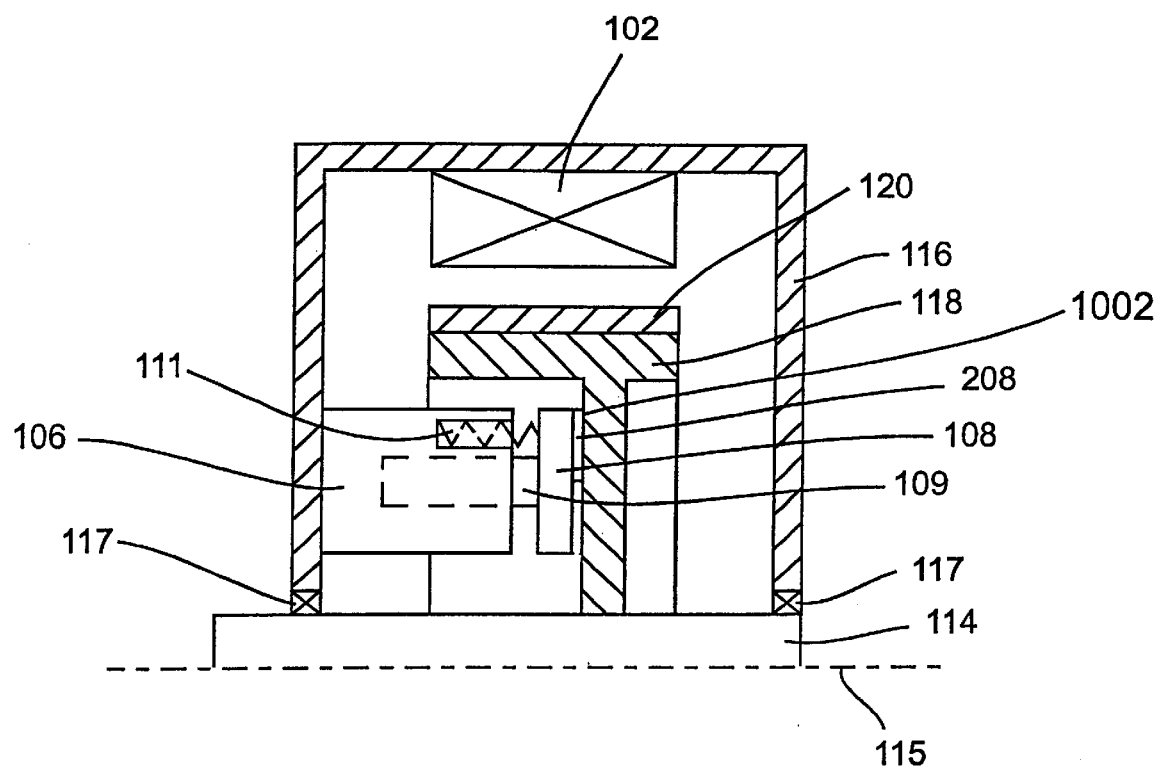
FIG. 10 is a cross-sectional view of a motor assembly according to a third preferred embodiment of the present invention.

FIG. 10 is a cross-sectional view of a motor assembly according to a third preferred embodiment of the present invention, wherein the brake piston 109 and the brake actuating plate 108 move in a direction parallel to the rotor axis 115, and press the brake pad 208 against an inner surface 1002 of the rotor 118 to generate a braking force. The brake pad 208 is preferably fixed to the brake actuating plate 108. The inner surface 1002 is substantially perpendicular to the rotor axis 115. FIG. 10 also shows a brake spring 111 that urges the brake actuating plate 108 toward the inner surface 1002 of the rotor 118 so that the brake is a "failsafe" that functions in substantially the same way as the brakes described above and shown in FIGS. 2–6 and 8–9.

Although only one spring 111 is shown in FIG. 10, a plurality of springs can be provided to ensure that braking forces are evenly applied across the braking surfaces and to ensure that forces on the rotor hub are balanced. Alternately, a single spring having a larger diameter than the piston 109 and sharing a longitudinal axis with the piston 109 can be provided. In addition, the brake pad 208 can extend annularly around the motor shaft axis 115, or multiple brake pads 208 can be provided located symmetrically about the rotor shaft axis 115.

Figure 11:
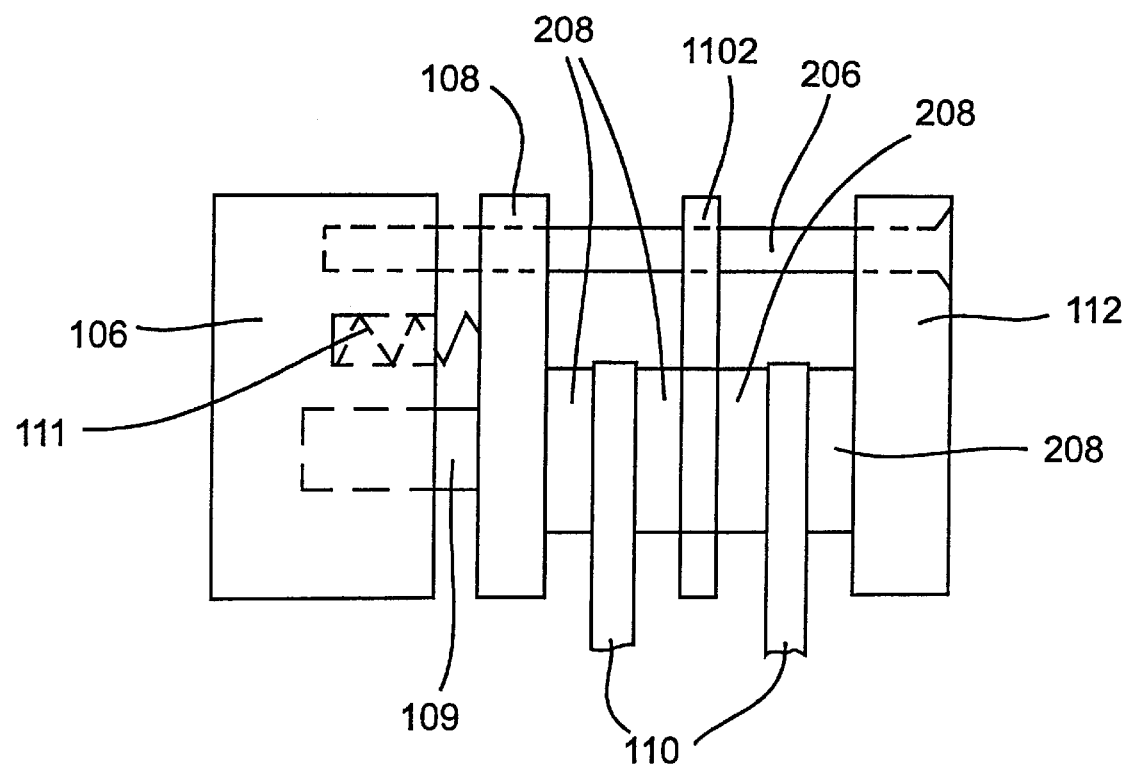
FIG. 11 is a cross-sectional view of a motor assembly according to a fourth preferred embodiment of the present invention.

FIG. 11 is a cross-sectional view of a motor assembly according to a fourth preferred embodiment of the present invention. The brake shown in FIG. 11 is similar to the brakes shown in FIGS. 2, 5 and 6 and operates in a similar fashion, but differs in that a plurality of brake discs 110 and a brake pad support member 1102 are provided. The brake discs 110 are sandwiched between the brake actuating plate 108, the brake pad support member 1102 and the brake containment portion 112. Thus, when the brake is engaged as shown in FIG. 11, the brake discs 110 are squeezed between brake pads 208 attached to the brake actuating plate 108, the brake pad support member 1102, and the brake containment portion 112. The brake is preferably configured to allow the discs 110 and the brake pad support member 1102 to slide freely in directions parallel to the rotational axis of the rotor 114. This ensures that the forces exerted on the brake discs 110 by the brake actuating plate 108, the containment portion 112 and the brake pad support member 1102 are equal or balanced.

Figure 12:
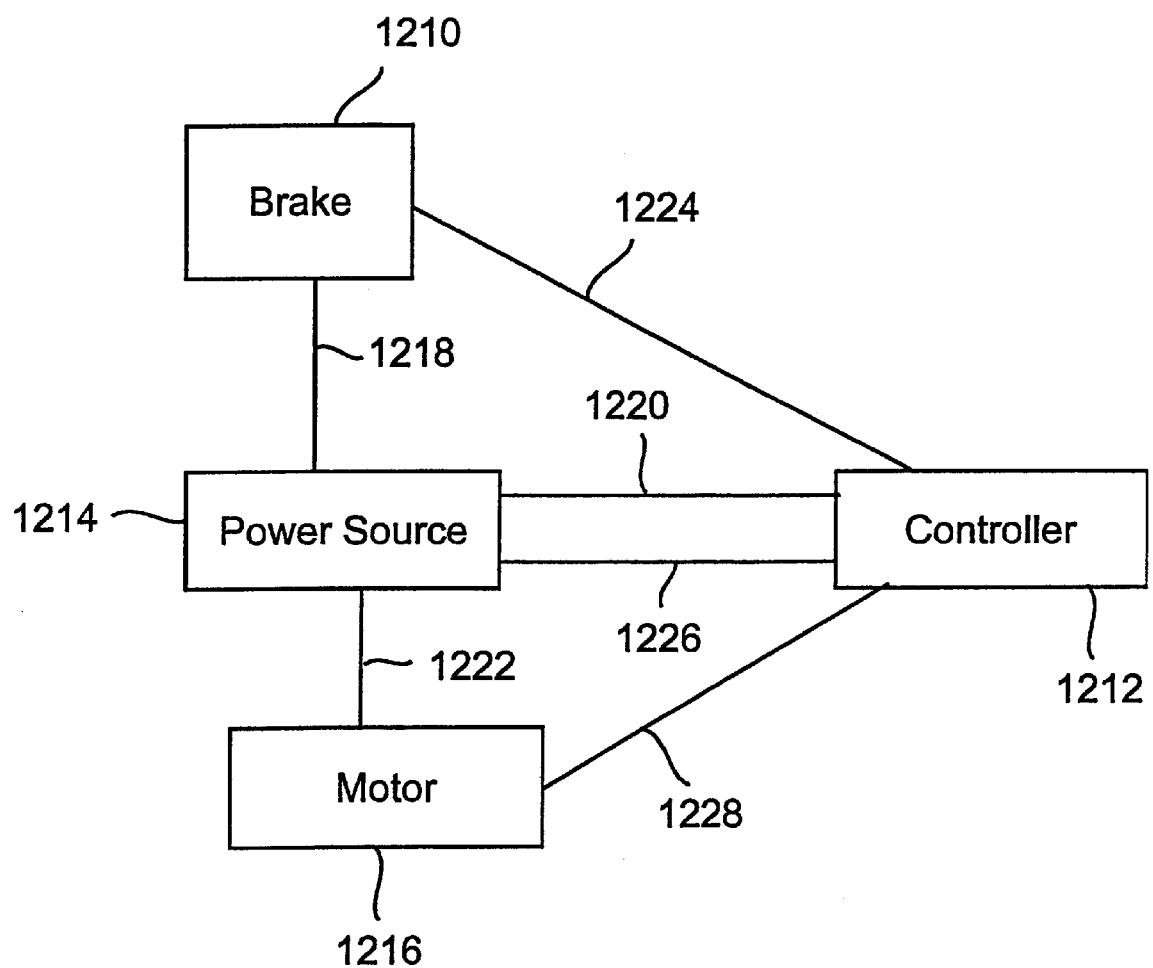
FIG. 12 is a schematic representation of connections between a motor, brake, power supply, and controller in accordance with an exemplary embodiment of the present invention.

FIG. 12 is a schematic representation of connections between a motor, brake, power supply, and controller in accordance with an exemplary embodiment of the present invention. In particular, FIG. 12 shows friction brake 1210, a controller 1212, a motor 1216, and a power source 1214. The controller can be a microprocessor, microcontroller, or other suitable control device, and can be digital or analog. The power source 1214 provides electrical power to the friction brake 1210, controller 1212 and motor 1216 via connections 1218–1222. The controller provides control signals to the friction brake 1210, power source 1214 and motor 1216 via connections 1224–1228. The configuration shown in FIG. 12 can be applied with respect to the embodiments described above.

Although the invention has been described in detail with reference only to presently preferred embodiments, those skilled in the art will appreciate that various modifications can be made without departing from the invention. For example, the brake can be arranged in a non-"failsafe" configuration where the brake a) is disengaged by default and engages when activated, or b) toggles between engagement or disengagement when activated. For example, the springs 111 can be configured to urge the brake out of engagement rather than into engagement. In addition, brake pads can be affixed to the brake disc or drum of the brake instead of the actuating plate, or alternately can be attached to all braking surfaces in the brake. Those skilled in the art will also recognize that brakes of various designs can be adapted for use in the present invention, and can be actuated in different ways. For example, a brake within the scope of the invention can be actuated via mechanical, electromechanical, hydraulic, or other mechanisms. Accordingly, the invention is defined only by the following claims which are intended to embrace all equivalents thereto.

What is claimed is:

1. A brushless permanent magnet inner-rotor electric motor comprising:

a housing;

a stator fixed relative to the housing;

a drive shaft;

a rotor within the stator and fixed to the drive shaft, wherein the rotor has an axial length and includes a hollow portion surrounding a portion of the drive shaft and extends more than 50% along the axial length of the rotor;

a plurality of permanent magnets on an outer circumferential surface of the rotor;

a brake disc having an inner face and an outer face and located within the hollow portion of the rotor and mounted on the drive shaft so as to be rotationally fixed but axially moveable in relation to the drive shaft by a matching non-circular configuration on a surface of a shaft hole in the brake disc and an outer surface of the drive shaft;

a brake core assembly projecting axially into the hollow portion of the rotor and comprising (a) a brake actuating plate mounted to move toward and away from the disc outer surface and (b) a containment portion which is located adjacent the inner face of the brake disc;

at least one spring carried by the brake core assembly to bias the brake actuating plate toward the disc outer face and the containment portion; and an electromagnetic brake release mechanism located within the inner diameter of the rotor and adjacent to the brake actuating plate, the arrangement being such that the electromagnetic brake release mechanism pulls the brake actuating plate away from the brake disc when activated.

2. The motor of claim 1, further comprising:

a plurality of brake discs rotationally fixed to the drive shaft and axially spaced along the drive shaft within the hollow portion of the rotor.

3. The motor of claim 1, wherein the motor is a direct current motor.

* * * * *